(12) United States Patent
Takaki et al.

(10) Patent No.: US 8,334,625 B2
(45) Date of Patent: Dec. 18, 2012

(54) METHOD FOR MANUFACTURING A STORAGE DISK DRIVE MOTOR, MOTOR FOR DRIVING A STORAGE DISK AND STORAGE DISK DRIVE APPARATUS PROVIDED WITH THE MOTOR

(75) Inventors: Hitoshi Takaki, Kyoto (JP); Tatsuya Tatara, Kyoto (JP); Hiroaki Inamori, Kyoto (JP)

(73) Assignee: Nidec Corporation, Kyoto (JP)

( * ) Notice: Subject to any disclaimer, the term of this patent is extended or adjusted under 35 U.S.C. 154(b) by 411 days.

(21) Appl. No.: 12/749,149

(22) Filed: Mar. 29, 2010

(65) Prior Publication Data

US 2010/0246349 A1 Sep. 30, 2010

(30) Foreign Application Priority Data

Mar. 27, 2009 (JP) ................................. 2009-078983
Jan. 25, 2010 (JP) ................................. 2010-013004

(51) Int. Cl.
*H02K 11/00* (2006.01)
*H02K 5/00* (2006.01)
*G11B 19/20* (2006.01)

(52) U.S. Cl. .................... 310/67 R; 310/425; 360/98.07; 360/99.01; 360/99.04; 360/99.08

(58) Field of Classification Search .................... 310/90, 310/67 R, 418–429, 91; 369/47.15, 264; 360/98.07, 99.01, 99.04, 99.08; 720/707
See application file for complete search history.

(56) References Cited

U.S. PATENT DOCUMENTS 6,339,273 B1 * 1/2002 Higuchi ........................... 310/91
6,826,771 B1 * 11/2004 Wada ............................ 720/707
7,023,116 B2 * 4/2006 Kuribara ........................... 310/90
7,550,884 B2 * 6/2009 Nomura et al. .............. 310/67 R
7,876,005 B2 * 1/2011 Ichizaki ....................... 310/67 R
2004/0256926 A1 * 12/2004 Miyamoto .................. 310/68 B
2007/0228851 A1 * 10/2007 Smirnov et al. ................. 310/90
2007/0273238 A1 * 11/2007 Nomura et al. ............... 310/217
2007/0290571 A1 * 12/2007 Yoon ............................. 310/261

FOREIGN PATENT DOCUMENTS

| JP | 8-256442 A | 10/1996 |
| JP | 8-317587 A | 11/1996 |
| JP | 2000-199521 A | 7/2000 |
| JP | 2000-324754 A | 11/2000 |
| JP | 2001-295846 A | 10/2001 |
| JP | 2002-317815 A | 10/2002 |
| JP | 2003-83347 A | 3/2003 |
| JP | 2006-200573 A | 8/2006 |
| JP | 2008-275044 A | 11/2008 |

* cited by examiner

*Primary Examiner* — Quyen Leung
*Assistant Examiner* — Leda Pham
(74) *Attorney, Agent, or Firm* — Westerman, Hattori, Daniels & Adrian, LLP

(57) ABSTRACT

A storage disk drive motor 12 includes a stator unit 2, a rotor unit 3, a shaft 41 arranged in a coaxial relationship with a center axis 9, a sleeve unit 22 including a flange portion 223, and a base member 21, having a through-hole, fixed to the sleeve unit 22 by caulking. The flange portion 223 includes a flange lower surface 223b making contact with an upper surface 21a of the base member 21 and a jut 24 protruding downwards from a radial inner side of the flange lower surface 223b. The jut 24 includes a first outer circumferential surface 241 opposed to the inner circumferential surface 21c of the base member 21, a second outer circumferential surface 242 positioned below the first outer circumferential surface 241, and a groove 243 radially inwardly indented from the first outer circumferential surface 241 and the second outer circumferential surface 242.

20 Claims, 13 Drawing Sheets

METHOD FOR MANUFACTURING A STORAGE DISK DRIVE MOTOR, MOTOR FOR DRIVING A STORAGE DISK AND STORAGE DISK DRIVE APPARATUS PROVIDED WITH THE MOTOR

BACKGROUND OF THE INVENTION

1. Field of the Invention

The present invention relates to a method for manufacturing a storage disk drive motor, a motor for driving a storage disk and a storage disk drive apparatus provided with the motor.

2. Description of the Related Art

A storage disk drive apparatus for use in reproducing information from and recording information on a storage disk such as a CD-ROM, a DVD or the like (hereinafter referred to as a disk) can be equipped with a storage disk drive motor for rotationally driving the disk.

Such a motor includes a base plate formed by pressing a disk-shaped steel plate and fixed to the disk drive apparatus, and a hollow cylindrical bearing support member fitted to and caulked with the central portion of the base plate. A rotating member for holding a storage disk on its upper surface is rotatably supported on the inner circumferential surface of the bearing support member through a bearing.

For example, Japanese Patent Application Publication No. 8-317587 discloses a motor in which the bearing support member is fixed to the base plate by caulking.

However, in cases of the motor of Japanese Patent Application Publication No. 8-317587, it is likely that the base plate deforms when a caulking process is performed, and caulking force applies to the inner circumferential portion of the base plate in the radially outward direction. As a consequence, the motor is installed in the disk drive apparatus in a tilting manner when the base plate is attached to the disk drive apparatus.

SUMMARY OF THE INVENTION

The present invention provides a method for manufacturing a storage disk drive motor, which reduces deformation of a base member and securely fixes the base member to the motor, and to provide a storage disk drive motor manufactured by the method. Further, the present invention provides a storage disk drive motor with enhanced durability and reliability. Further, the present invention provides a storage disk drive apparatus provided with such a motor.

In accordance with a first embodiment of the invention, there is provided a method for manufacturing a storage disk drive motor, the motor including: a base member provided with a vertically extending through-hole, and a sleeve unit provided with a flange lower surface making contact with the upper surface of the base member and a jut protruding downwards from a radial inner side of the flange lower surface, the jut including a first outer circumferential surface opposed to the inner circumferential surface of the base member, a second outer circumferential surface positioned below the first outer circumferential surface and a groove positioned between, and radially inwardly indented from, the first outer circumferential surface and the second outer circumferential surface, wherein the method comprises the steps of: a) bringing the flange lower surface into contact with an upper surface of the base member; and b) plastically deforming the jut radially outwards to bring the jut into contact with a lower surface and/or an inner-circumferential lower end portion of the base member.

In accordance with a second embodiment of the present invention, there is provided a storage disk drive motor, which includes: a stator unit; a rotor unit rotatable with respect to the stator unit, the rotor unit including a disk support portion arranged to support a storage disk thereon; a shaft arranged in a coaxial relationship with a vertically-extending center axis; a sleeve unit including a flange portion protruding radially outwards, and a base member fixed to the lower portion of the sleeve unit by caulking, the base member including a vertically extending through-hole, wherein the flange portion includes a flange lower surface making contact with an upper surface of the base member and a jut protruding downwards from a radial inner side of the flange lower surface, the jut including a first outer circumferential surface opposed to an inner circumferential surface of the base member, a second outer circumferential surface positioned below the first outer circumferential surface and a groove positioned between, and radially inwardly indented from, the first outer circumferential surface and the second outer circumferential surface, the jut being plastically deformed radially outwards to make contact with a lower surface and/or an inner-circumferential lower end portion of the base member.

With the first and second embodiments of the present invention, the caulking force radially applied to the base member is reduced by the jut while increasing the caulking force applied to the axial direction, and thereby to securely fix the base member to the lower portion of the sleeve unit.

Other features, elements, steps, characteristics and advantages of the present invention will become more apparent from the following detailed description of the embodiments of the present invention with reference to the attached drawings.

DETAILED DESCRIPTION OF THE INVENTION

The embodiments of the present invention will now be described with reference to the accompanying drawings.

1. Storage Disk Drive Motor of One Embodiment

Figure 1:
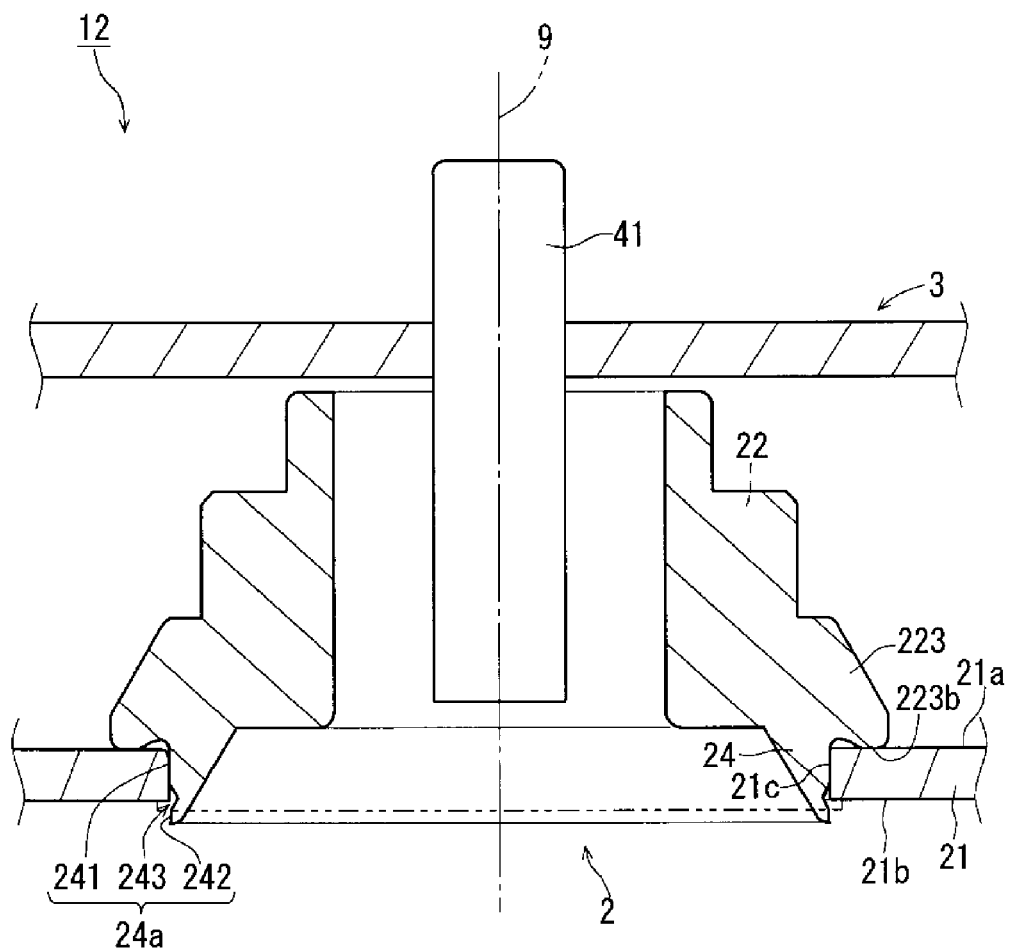
FIG. 1 is a conceptual diagram showing a storage disk drive motor according to the first embodiment of the present invention.

FIG. 1 illustrates a storage disk drive motor 12 according to an embodiment of the present invention.

Referring to FIG. 1, the storage disk drive motor 12 includes a stator unit 2, a rotor unit 3 rotatable with respect to the stator unit 2, the rotor unit 3 having a disk support portion 424 (see FIG. 3) arranged to support a disk 90 thereon, a shaft 41 arranged in a coaxial relationship with a vertically-extending center axis 9, a sleeve unit 22 provided with a flange portion 223 protruding radially outwards (where the term "radially" or "radial" used herein denotes a direction perpendicular to the center axis 9), and a base member 21 fixed to the lower portion of the sleeve unit 22 by caulking, the base member 21 having an axially-extending through-hole (where the term "axially" or "axial" used herein denotes a direction extending along the center axis 9).

The flange portion 223 of the motor 12 includes a lower surface 223b making contact with an upper surface 21a of the base member 21 and a jut 24 protruding downwards from the region defined radially inwards of the lower surface 223b. The jut 24 has an outer circumferential surface 24a, including a first outer circumferential surface 241 opposed to the inner circumferential surface 21c of the base member 21, a second outer circumferential surface 242 positioned below the first outer circumferential surface 241 and a groove or groove 243 located or defined between the first and second outer circumferential surfaces 241 and 242. The groove 243 is indented radially inwards from the first and second outer circumferential surfaces 241 and 242.

In order to fix the base member 21 and the sleeve unit 22 together in a manufacturing process of the motor 12, the lower surface 223b is first brought into contact with the upper surface 21a of the base member 21. Then, the lower end extension of the jut 24 is plastically deformed radially outwards using the groove 243 as a pivot point so that the jut 24 can be partially brought into contact with the lower surface 21b and/or the inner-circumferential lower end portion (or the circumferential lower corner) of the base member 21. In FIG. 1, the contour line delineating the caulked lower end extension of the jut 24 is indicated by double-dotted chain lines.

In the storage disk drive motor 12, the inner circumferential surface 21c of the base member 21 is fixed axially between the lower surface 223b of the flange portion 223 and the jut 24 through a caulking process by bringing the inner circumferential surface 21c of the base member 21 and the outer circumferential surface 24a of the jut 24 into contact with each other and plastically deforming the lower end extension of the jut 24 radially outwards. The caulking process of the invention reduces the caulking force applied to the base member 21 in the radial direction, while increasing the caulking force in the axial direction, and thereby to securely fix the base member 21 to the lower portion of the sleeve unit 22.

2. Specific Embodiments 2-1. Configuration of Storage Disk Drive Apparatus

Next, the embodiment of the invention is described in more detail. In the following description, a brushless motor 12 is described as one example of the storage disk drive motor of the present invention.

Hereinafter, the direction extending along the center axis 9 is referred to as a vertical direction. The side of a clamper 13 with respect to the disk 90 held by a chucking device 4 is defined as "upper" and the side of a rotor holder 42 is defined as "lower". The shape and positional relationship of the respective members is described based on these definitions. These definitions in the description are presented for convenience, but shall not be construed as incorporating them to limit the scope of the invention, including the postures of the chucking device 4, the brushless motor 12 and the storage disk drive apparatus 1 of the present invention when they are actually mounted to devices.

Figure 2:
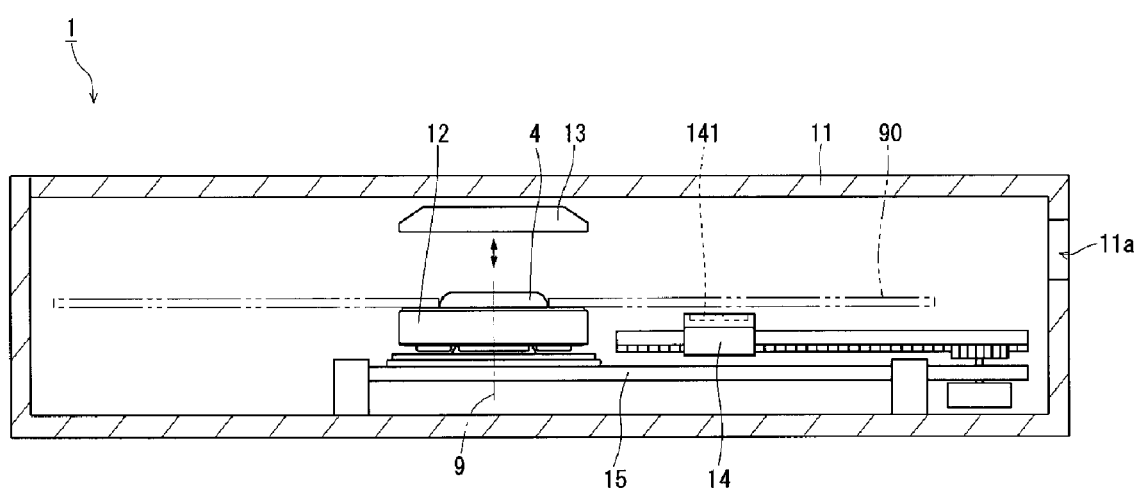
FIG. 2 is a vertical section view showing a disk drive apparatus of the first embodiment.

FIG. 2 is a vertical section view showing a storage disk drive apparatus 1. The apparatus 1 can read out information from the disk 90 and/or write information on the disk 90 while rotating the disk 90 about the center axis 9. As shown in FIG. 2, the apparatus 1 includes an apparatus housing 11, the brushless motor 12, the clamper 13 and a recording/reproducing unit 14.

The apparatus housing 11 accommodates therein the brushless motor 12, the clamper 13 and the recording/reproducing unit 14. The apparatus housing 11 includes an opening portion 11a through which the disk 90 is loaded and unloaded. The brushless motor 12 is fixed to a chassis 15 provided within the apparatus housing 11. The brushless motor 12 includes a chucking device 4 arranged to hold the disk 90 placed thereon. The disk 90 loaded into the apparatus housing 11 can be held between the chucking device 4 and the clamper 13 and be rotated about the center axis 9 by the brushless motor 12.

The recording/reproducing unit 14 includes an optical pickup unit 141 arranged to move across the storage surface of the disk 90 rotated by the motor 12. The recording/reproducing unit 14 can read out information from the disk 90 and/or write information on the disk 90.

2-2. Configuration of Brushless Motor

Figure 3:
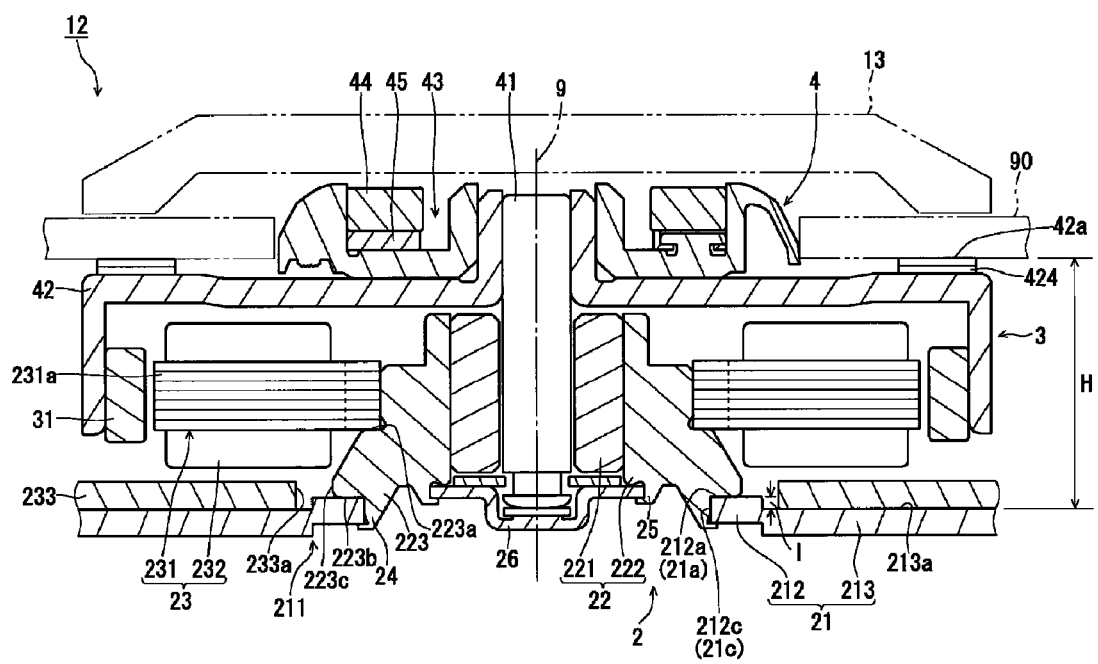
FIG. 3 is a vertical section view showing a brushless motor of the first embodiment.

Next, the configuration of the brushless motor 12 is described. FIG. 3 is a vertical section view showing the brushless motor 12. Referring to FIG. 3, the brushless motor 12 includes a stator unit 2 fixed to the chassis 15 of the storage disk drive apparatus 1 (see FIG. 2), a rotor unit 3 rotatably supported on the stator unit 2 and a chucking device 4 arranged above the rotor unit 3 to rotate therewith while holding the disk 90 in place.

The stator unit 2 includes an attachment plate 21 as an embodiment of the base member, a sleeve unit 22 fixed to the attachment plate 21 and a magnetic flux generating unit 23. The sleeve unit 22 rotatably supports the shaft 41. The sleeve unit 22 includes a jut 24. The sleeve unit 22 can be made of a substantially cylindrical sleeve that is coaxial with the center axis 9. The magnetic flux generating unit 23 includes a stator core 231 with a plurality of teeth 231a and coils 232 wound around the respective teeth 231a.

The rotor unit 3 includes a shaft 41, a rotor holder 42 and a rotor magnet 31. The shaft 41 can be made of a substantially cylindrical columnar member arranged to vertically extend along the center axis 9. The rotor holder 42 is fixed to the shaft 41 for rotation therewith. The rotor magnet 31 is fixed to the rotor holder 42. The rotor magnet 31 has an annular shape, the inner circumferential surface of which serves as a magnetic pole surface that is opposed to the end surfaces of the teeth 231a of the stator core 231.

As shown in FIG. 3, a circuit board 233 is arranged below the coils 232 and fixed to the upper surface of the attachment plate 21. Conductive wires extend from the coils 232 and are leaded to the circuit board 233 and bonded to the electrodes of the circuit board 233 by soldering or other bonding methods.

An electric current can be supplied from an external power source (not shown) to the coils 232 through the circuit board 233, thereby generating radial magnetic flux in the teeth 231a of the stator core 231. A torque in the circumferential direction can be generated by a magnetic interaction between the teeth 231a and the rotor magnet 31, causing the rotor unit 3 to rotate about the center axis 9 relative to the stator unit 2. Consequently, the brushless motor 12 can be rotationally driven.

The chucking device 4 is provided on the shaft 41 and the rotor holder 42. The chucking device 4 includes a cone 43, a clamp magnet 44 and a back yoke 45.

The rotor holder 42 is provided with a disk support surface on which the disk 90 can be placed. As shown in FIG. 3, an annular rubber member 424 is fixed to the upper surface of the rotor holder 42. The disk 90 can be placed on the rotor holder 42. As illustrated, the lower surface of the disc can contact the upper surface 42a of the rubber member 424. In the embodiment, the rotor holder 42 and the rubber member 424 can cooperate to form a disk support portion, the upper surface 42a of the rubber member 424 serving as a disk support surface.

The cone 43 can be made of a member (or a disk retainer member) for retaining a circular aperture formed at the center of the disk 90, namely, the inner circumferential edge of the disk 90. The cone 43 is fixed to the rotor holder 42.

The clamp magnet 44 and the back yoke 45 are accommodated within the cone 43. The clamp magnet 44 and the back yoke 45 can generate a magnetic attraction force to the clamper 13 so that the clamper 13 can be closely attracted toward the rotor holder 42.

When holding the disk 90 in place, the clamper 13 can be closely attracted toward the rotor holder 42 by the magnetic attraction force acting between the clamp magnet 44 and clamper 13. Thus, the disk 90 can be gripped between the upper surface 42a of the rubber member 424 and the lower surface of the clamper 13. The cone 43 can contact the circular aperture of the disk 90 to position the disc such that the center of the disk 90 coincides with the center axis 9. The upper surface 42a of the rubber member 424 and the lower surface of the clamper 13 come into contact with the lower and upper surfaces of the disk 90, respectively, to position the disk 90 at the given axial position and posture.

2-3. Detailed Configuration of Sleeve Unit

Next, the configuration of the sleeve unit 22 is described in detail. As shown in FIG. 3, the sleeve unit 22 of the embodiment includes a substantially cylindrical hollow sleeve 221 into which the shaft 41 is inserted. The sleeve unit 22 also includes a substantially cylindrical hollow sleeve housing 222 inserted into the inner circumference of the sleeve 221. In this embodiment, the sleeve housing 222 is made of a substantially cylindrical member that can be made of a material such as iron, stainless steel or brass. The sleeve 221 can be made of oil-containing sintered metal.

A seal cap 26 for closing the lower end portion of the sleeve housing 222 is attached to the undersurface of the sleeve housing 222. The seal cap 26 is fixed to the sleeve housing 222 by caulking.

2-3-1. Configuration of Flange Portion

Figure 4:
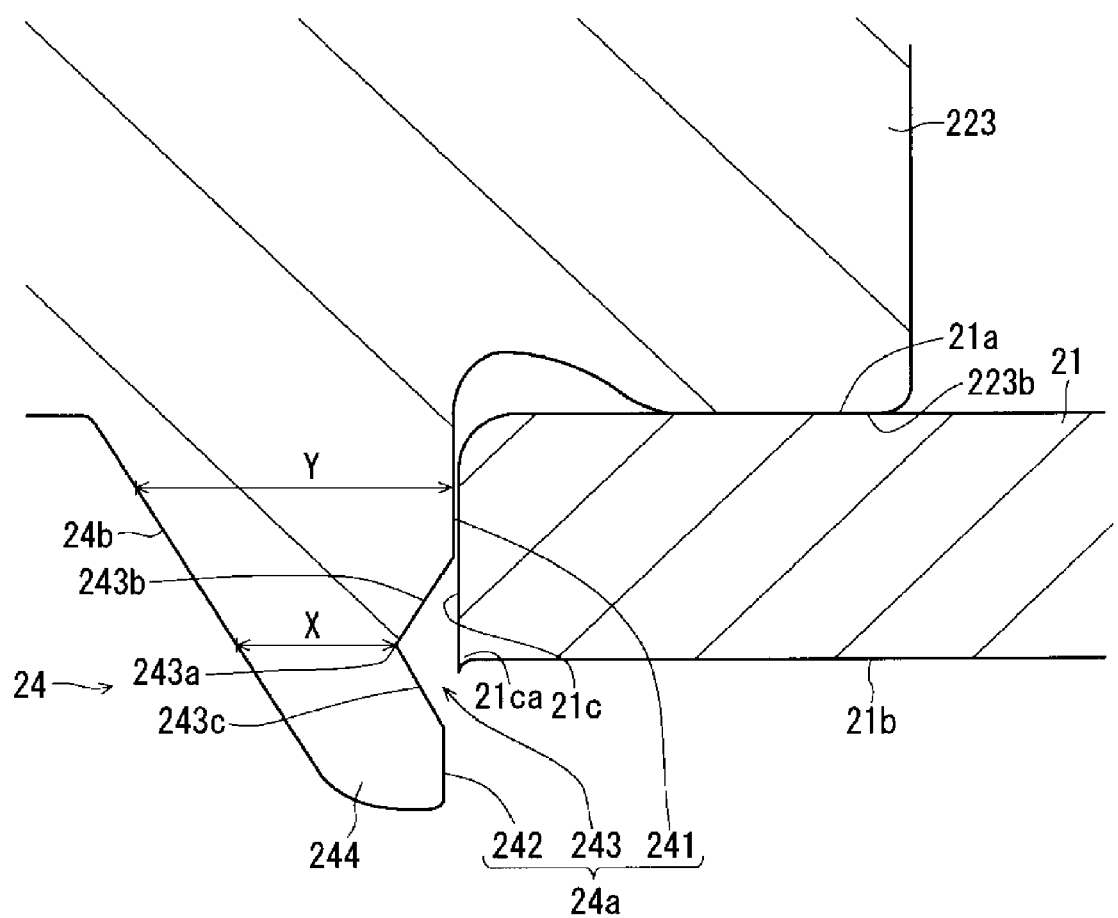
FIG. 4 is an enlarged vertical section view illustrating a jut and its vicinities of the first embodiment.

An attachment plate 21 serves to fix the brushless motor 12 to the storage disk drive apparatus 1. The attachment plate 21 is attached to the undersurface of the flange portion 223 extending radially outwards from the lower end portion of the sleeve housing 222. The attachment plate 21 is fixed to the flange portion 223 through a caulking process by plastically deforming radially outwards the jut 24 protruding downwards from the lower surface 223b of the flange portion 223 in a substantially cylindrical shape. Hereinafter, the configurations of the flange portion 223 and the jut 24 is described with reference to FIGS. 3 and 4. FIG. 4 is an enlarged vertical section view showing the jut 24 and its vicinities.

The flange portion 223 is described first. Either the teeth 231a or the portion of the stator core 231 other than the teeth 231a can contact the upper surface 223a of the flange portion 223.

Next, the lower surface 223b of the flange portion 223 is described. A fixation portion 25 arranged to fix the seal cap 26 by caulking is provided on the lower surface of the sleeve housing 222. The fixation portion 25 and the jut 24 protrude downwards from the lower surface of the sleeve housing 222 in a radially spaced-apart relationship with each other. The jut 24 protrudes downwards from an area of the lower surface 223b of the flange portion 223, that is radially inwardly deviated from the radial outer end portion 223c of the flange portion 223 by a specified dimension. The portion of the lower surface 223b of the flange portion 223 running from the radial outer end portion 223c of the flange portion 223 to the jut 24 is made of a planar surface that is substantially perpendicular to the center axis 9. When caulking the jut 24, the upper surface 21a of the attachment plate 21 comes into contact with the lower surface 223b of the flange portion 223. The term "specified dimension" used herein means a dimension great enough to fix the attachment plate 21 by caulking.

2-3-2. Configuration of Jut

Next, the configuration of the jut 24 is described. The following description is directed to the state of the jut 24 prior to performing the plastic deformation unless specifically mentioned otherwise.

The jut 24 of the embodiment enables the caulking means to fix the attachment plate 21.

FIG. 4 shows the pre-caulking state of the jut 24. The outer circumferential surface 24a of the jut 24 includes a first outer circumferential surface 241, a second outer circumferential surface 242 and a groove 243. The first outer circumferential surface 241 is opposed to the inner circumferential surface 21c of the attachment plate 21 with a minute gap left therebetween. The second outer circumferential surface 242 is positioned below the first outer circumferential surface 241. The groove 243 is positioned axially between the first and second outer circumferential surfaces 241 and 242 and is indented radially inwards from the lower end of the first outer circumferential surface 241 and the upper end of the second outer circumferential surface 242.

2-3-3. Configuration of Groove

As illustrated in FIG. 4, the groove 243 of the embodiment has a cross sectional view that has a substantially "V"-like character opened radially outwards in a pre-caulking state. The radially innermost indented portion of the groove 243 is called an apex portion 243a. The surfaces of the "V"-like groove 243 includes a first slanting surface 243b extending upwards from the apex portion 243a and a second slanting surface 243c extending downwards from the apex portion 243a.

Figure 5:
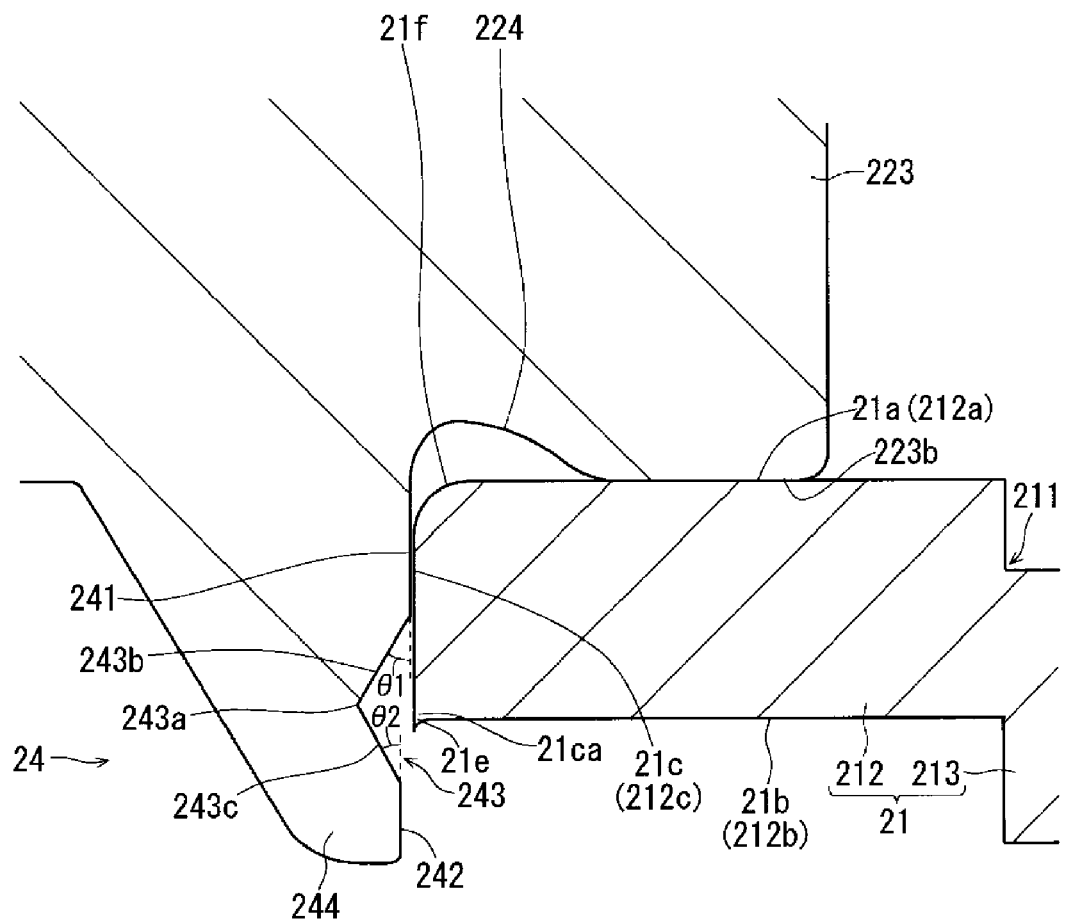
FIG. 5 is a partially enlarged section view showing the jut and its vicinities before a caulking process is performed in the first embodiment.

As shown in FIG. 5, the groove 243 can ensure that when the jut 24 is in a pre-caulking state, the dimension X in the radial direction from the apex portion 243a to the radial inner portion of the jut 24 (i.e., the inner circumferential surface 24b of the jut 24) is smaller than the dimension Y in the radial direction from the first outer circumferential surface 241 to the radial inner portion of the jut 24 (i.e., the inner circumferential surface 24b of the jut 24).

In this regard, the end extension of the jut 24 positioned below the apex portion 243a is referred to as a free end portion (or a caulking portion) 244. The free end portion 244 includes the second slanting surface 243c and the second outer circumferential surface 242. The a free end portion can be plastically deformed about a pivot point near the apex portion 243a when a caulking jig is applied. In the cross-sectional view, the thickness of at least a part of the free end portion perpendicularly extending from the second slanting surface toward the inner side of the jut can be substantially the same, as illustrated in FIG. 5 In a caulking process, the upper surface 21a of the attachment plate 21 can be brought into contact with the lower surface 223b of the flange portion 223, and the first outer circumferential surface 241 of the jut 24 can be brought into an opposing relationship with the inner circumferential surface 21c of the attachment plate 21. Then, a caulking jig can give a caulking force to the inner circumferential surface of the free end portion 244 (namely, a portion of the inner circumferential surface 24b of the jut 24) to press and plastically deform the free end portion 244 radially outwards. Upon applying the caulking force, the jut 24 can be plastically deformed about a pivot point near the apex portion 243a. In other words, the free end portion 244 can be plastically deformed about a base portion near the apex portion 243a. Thus, the free end portion 244 of the jut 24 comes into contact with the lower surface 21b and/or the inner-circumferential lower end portion (or circumferential lower corner) 21ca of the attachment plate 21. The attachment plate 21 can be fixed to the sleeve unit as the jut 24 is plastically deformed by a specified amount.

Since the jut 24 is provided with the apex portion 243a serving as a pivot point as set forth above, it can fix the attachment plate 21 to the sleeve unit 22 with a relatively small caulking force and in an easy manner as compared with the prior art configuration having no groove. The portion of the jut 24 having the dimension X can be the thinnest in the radial direction and can be the place where the caulking forced is most strongly applied in the caulking process. This makes it easy to transfer the caulking force to the attachment plate 21 (namely, the first plate portion 212 to be described later).

Inasmuch as the free end portion 244 can come into contact with the lower surface 21b and/or the inner-circumferential lower end portion 21ca of the attachment plate 21, the caulking force radially acting on the attachment plate 21 can be reduced but to increase the caulking force axially acting on the attachment plate 21, as compared with the prior art process. The process of the invention can securely fix the attachment plate 21 to the lower portion of the sleeve unit 22.

Either the second slanting surface 243c of the jut 24 or the second outer circumferential surface 242 of the jut 24 can make contact with the lower surface 21b and/or the inner-circumferential lower end portion 21ca of the attachment plate 21. In consideration of a number of factors, either one of the second slanting surface 243c and the second outer circumferential surface 242 can be brought into contact with the lower surface 21b and/or the inner-circumferential lower end portion 21ca of the attachment plate 21. Referring to FIG. 5, such factors can include the shape of the groove 243, the depth of the groove 243, the angle θ1 between the first slanting surface 243b of the groove 243 and the center axis 9, and the angle θ2 between the second slanting surface 243c of the groove 243 and the center axis 9. FIG. 5 is a partially enlarged vertical section view showing the jut 24 and its vicinities before the caulking process is performed.

In a case where the groove 243 has a V-like shape, the value of the angle θ1 or θ2 can be about 10 to 45 degrees, preferably about 15 to 25 degrees, and more preferably about 15 degrees. The depth of the groove 243 is the radial dimension of the groove 243, namely the radial dimension from the apex portion 243a of the groove 243 to the outer circumferential surface (i.e., the first outer circumferential surface 241 and/or the second outer circumferential surface 242) of the jut 24. The radial dimension can be in a range of from about 0.01 mm to 0.25 mm in one embodiment, and can be in a range of from about 0.1 mm to 0.2 mm in another embodiment. In such a range, an axial caulking force can be appropriately applied to the attachment plate 21.

2-3-4. Configuration of Annular Groove (Undercut)

As shown in FIG. 5, an annular groove 224 is formed upwards to extend from the lower surface 223b of the flange portion 223 at or around the corner portion made by the lower surface 223b of the flange portion 223 and the first outer circumferential surface 241 of the jut 24.

If the attachment plate 21 is subjected to punching, a projecting portion 21e (called "burr") can be formed in the terminal edge portion of one surface of the attachment plate 21 while a curved surface portion 21f (called "sag") can be formed in the terminal edge portion of the other surface of the attachment plate 21.

In case where the projecting portion 21e protrudes downwards as illustrated in FIG. 4, it can make contact with the second slanting surface 243c of the jut 24 and/or the second outer circumferential surface 242 of the jut 24. This makes it possible to securely fix the attachment plate 21 in place. The terminal edge portion of one surface of the attachment plate 21 provided with the projecting portion 21e has an area greater than that of the terminal edge portion of one surface of the attachment plate 21 provided with the curved surface portion 21f. This makes it possible to increase the contact area between the attachment plate 21 and the second slanting surface 243c of the jut 24 and/or the second outer circumferential surface 242 of the jut 24. Accordingly, it is possible to facilitate the transfer of the caulking force to the attachment plate 21.

2-4. Detailed Configuration of Attachment Plate

Next, the configuration of the attachment plate 21 is described. The attachment plate 21 has an axially-extending through-hole and is fixed to the lower portion of the sleeve housing 222 by caulking. The attachment plate 21 is formed by subjecting a plate made of, e.g., iron, to a pressing process or other processes.

2-4-1. Overall Shape of Attachment Plate

Figure 6:
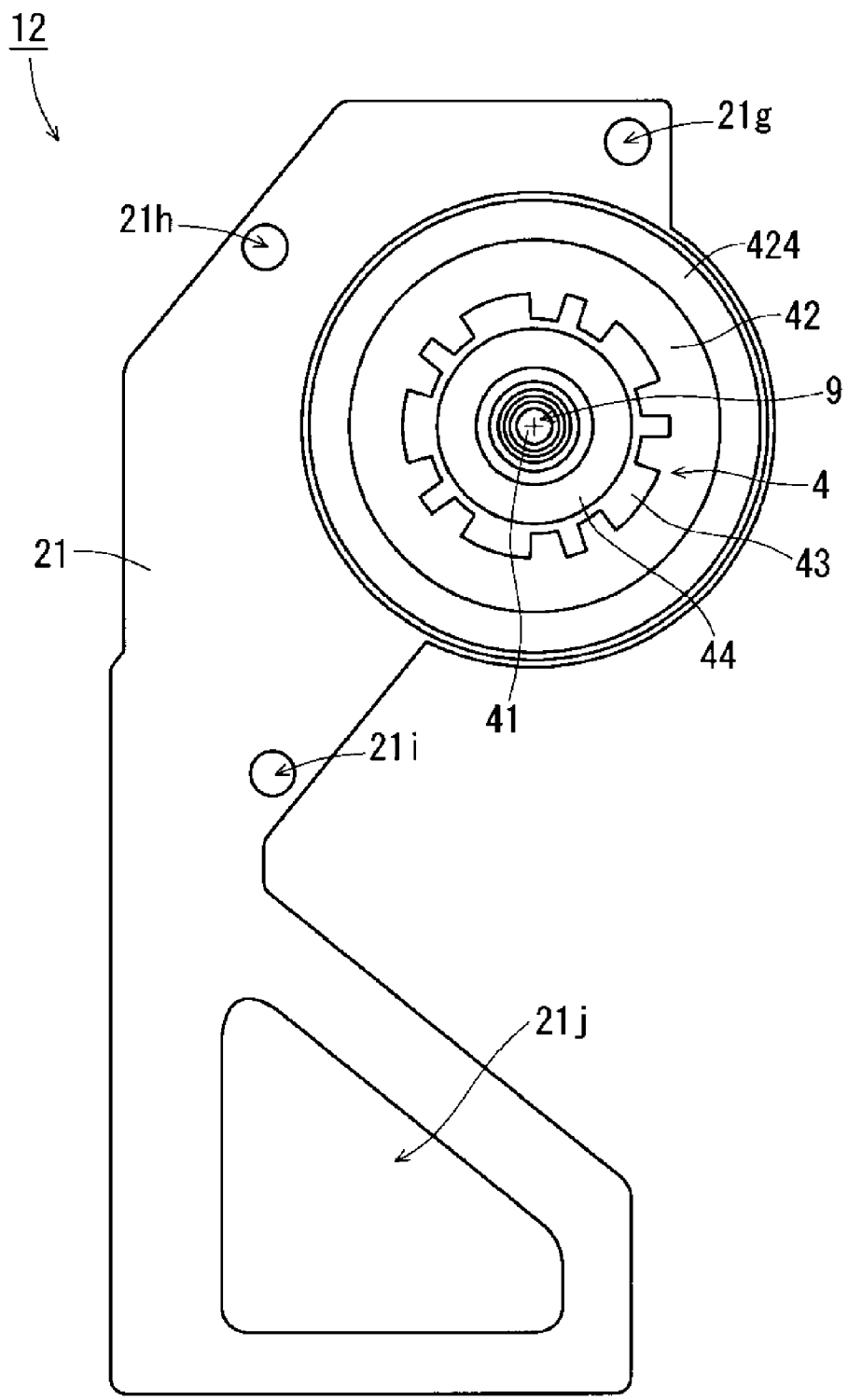
FIG. 6 is a plan view showing the brushless motor of the first embodiment.

FIG. 6 is a plan view showing the brushless motor 12, in which the circuit board 233 is not shown to clarify the shape of the attachment plate 21.

As shown in FIG. 6, the attachment plate 21 has three attachment holes 21g, 21h and 21i serving as fastening portions by which the attachment plate 21 is fixed to the specified portions of the storage disk drive apparatus 1. In the embodiment, screws are inserted into the attachment holes 21g, 21h and 21i, respectively, thereby fixing the attachment plate 21 to the chassis 15 of the storage disk drive apparatus 1.

The plane containing the upper end points of the attachment holes 21g, 21h and 21i or the plane containing the lower end points thereof is used as a reference plane for determining the planarity of the brushless motor 12. The dimension, position and posture of the respective members of the brushless motor 12 are designed on the basis of this plane.

As can be seen in FIG. 6, the attachment holes 21g, 21h and 21i are all positioned radially outwards of the outer circumferential surface of the rotor holder 42. However, the distances between the attachment holes 21g, 21h and 21i and the center axis 9 differ from one another. In a hypothetical case where the attachment plate 21 is deformed by fixing the attachment plate 21 and the sleeve housing 222 together, the amount of deformation becomes greater radially outwards.

This means that a difference in the deformation amount of the attachment plate 21 is likely to occur in the positions of the attachment holes 21g, 21h and 21i. If the difference occurs, the reference plane of planarity of the brushless motor 12 is tilted.

In the embodiment as shown in FIG. 6, each distance from the attachment holes 21g, 21h or 21i to the center axis 9 differs one from others. However, if the distance between at least one of the attachment holes 21g, 21h and 21i and the center axis 9 differs from the distance between the remaining two attachment holes and the center axis 9, a difference in the deformation amount of the attachment plate 21 is likely to occur in the positions of the attachment holes 21g, 21h and 21i.

In particular, as shown in FIG. 6, the attachment plate 21 of the embodiment has a substantially rectangular outward appearance with a partially constricted portion. The center axis 9 of the brushless motor 12 lies in the position deviated from the center of the attachment plate 21. This means that the outward appearance of the attachment plate 21 is not rotationally symmetrical with respect to the center axis 9. If the attachment plate 21 with such a shape is deformed, it is more likely to increase the difference in the deformation amount of the attachment plate 21 in the positions of the attachment holes 21g, 21h and 21i.

Referring again to FIG. 6, a weight-losing portion 21j is defined in the attachment plate 21 of the present preferred embodiment. The weight-losing portion 21j is a non-circular opening that does not involve in fixing the attachment plate 21 and other members together. Broadening the area of the weight-losing portion 21j helps reduce the weight of the attachment plate 21. However, the weight-losing portion 21j may result in complex deformation of the attachment plate 21. Therefore, there can be likely occur a difference in the deformation amount of the attachment plate 21 in the positions of the attachment holes 21g, 21h and 21i. Note that instead of the configuration as illustrated in FIG. 6, the weight-losing portion 21j can be provided near the attachment holes 21g, 21h and 21i.

Since the brushless motor 12 of the embodiment includes the groove 243 formed in the jut 24, the jut 24 can be caulked with a weaker force than is required without the groove 243. In addition, the axial component of the caulking force acting between the jut 24 and the attachment plate 21 can be increased. Therefore, deformation of the attachment plate 21 when fixing the sleeve housing 222 and the attachment plate 21 can be suppressed. As a result, the difference in the deformation amount of the attachment plate 21 occurring in the positions of the attachment holes 21g, 21h and 21i can be reduced, thereby to prevent the brushless motor 12 from being tilted within the storage disk drive apparatus 1.

2-4-2. Level Difference in Attachment Plate: First Plate Portion and Second Plate Portion Referring back to FIG. 3, the attachment plate 21 of the embodiment includes a first plate portion 212 having the inner circumferential surface 21c and a second plate portion 213 that is positioned radially outwards of the first plate portion 212 and located at a level lower than the first plate portion 212. The first plate portion 212 has an upper surface 212a making contact with the lower surface 223b of the flange portion 223. The inner circumferential surface 212c of the first plate portion 212 is opposed to the first outer circumferential surface 241 of the jut 24.

As shown in FIG. 3, the circuit board 233 is arranged above the second plate portion 213. The attachment plate 21 further includes a step portion 211 between the first plate portion 212 and the second plate portion 213. The step portion 211 is positioned between the inner circumferential portion 233a of the circuit board 233 and the radial outer end portion 223c of the flange portion 223. The step portion 211 can be readily formed by, e.g., a semi-drawing process.

Provision of the first and second plate portions 212 and 213 and arrangement of the circuit board 233 above the second plate portion 213 can assist in reducing the height of the brushless motor 12.

In the prior art process, the caulking force tends to be applied to the entire attachment plate 21, thus increasing the likelihood of deformation of the attachment plate 21. In the embodiment, however, the caulking force can be concentrated on the step portion 211 radially provided in the attachment plate 21 or the first plate portion 212 arranged radially inwards of the step portion 211, thereby to reduce the caulking stress generated in the second plate portion 213 and to suppress deformation of the second plate portion 213 in the course of fixing the attachment plate 21 in place.

Referring again to FIG. 3, the axial dimension H from the upper surface 213a (called a reference surface) of the second plate portion 213 to the disk support surface of the disk support portion (namely, the upper surface 42a of the rubber member 424) is used as a reference dimension in positioning the attachment plate 21. In addition, the axial dimension I between the upper surface 212a of the first plate portion 212 and the upper surface 213a of the second plate portion 213 is defined as the height of the step portion 211. In the embodiment, the axial dimension H can be adjusted by suitably changing the axial dimension I of the step portion 211. Thanks to this feature, it is possible to easily set the axial dimension H by suitably changing the axial dimension I of the step portion 211 after the sleeve unit 22 and the rotor unit 3 have been produced through a standardized process. This makes it possible to standardize the parts and also to standardize the jig or the like in the process of manufacturing the motor. Consequently, it becomes easy to automate the manufacturing process of the motor and to save labor.

The axial dimension I of the step portion 211 can be set such that it does not vary in the caulking process. In addition, the height of the step portion 211 can be increased, because the caulking force can be concentrated on the step portion 211 or the first plate portion 212 in the caulking process, thereby to reduce the deformation amount of the attachment plate 21. For example, the axial dimension I can be from about 0.3 mm to 0.4 mm in one embodiment, and can be about 0.35 mm in another embodiment.

If the radial dimension of the first plate portion 212 gets smaller, the deformation amount of the attachment plate 21 (especially, the first plate portion 212) in the caulking process becomes smaller. The radial dimension of the first plate portion 212 can be from about 10 mm to 15 mm in diameter. The radial outer end portion 223c of the flange portion 223 lying on the upper surface 212a of the first plate portion 212 is positioned to extend radially outwards beyond the radial middle portion of the first plate portion 212.

The cross-sectional shape of the step portion 211 of the attachment plate 21 is not particularly limited but can be made of a slanting surface shape or a step shape.

As described above, provision of the groove 243 on the outer circumferential surface 24a of the jut 24 can restrain the caulking force from being radially outwardly transferred to the attachment plate 21, thereby to increase the caulking force axially upwardly applied to the attachment plate 21. Thus, the first plate portion 212 can be gripped by the lower surface 223b of the flange portion 223 and the second outer circumferential surface 242 of the jut 24. In other words, provision of the groove 243 can reduce the radially-acting force but to increase the axially-acting force. Accordingly, the attachment plate 21 can be securely fixed to the sleeve housing 222 with a small caulking force, suppressing deformation of the attachment plate 21 while securing the strength required in a product. In addition, the deformation of the attachment plate 21 due to the caulking force can be suppressed by providing the first plate portion 212 and the second plate portion 213 in the attachment plate 21 so that the second plate portion 213 can be positioned radially outwards of the first plate portion 212 at a relatively lower elevation. As a result, it is possible to reduce the height of the motor and to restrain the axial dimension H from varying from motor to motor.

3. Detailed Flow of Caulking Process

Figure 7:
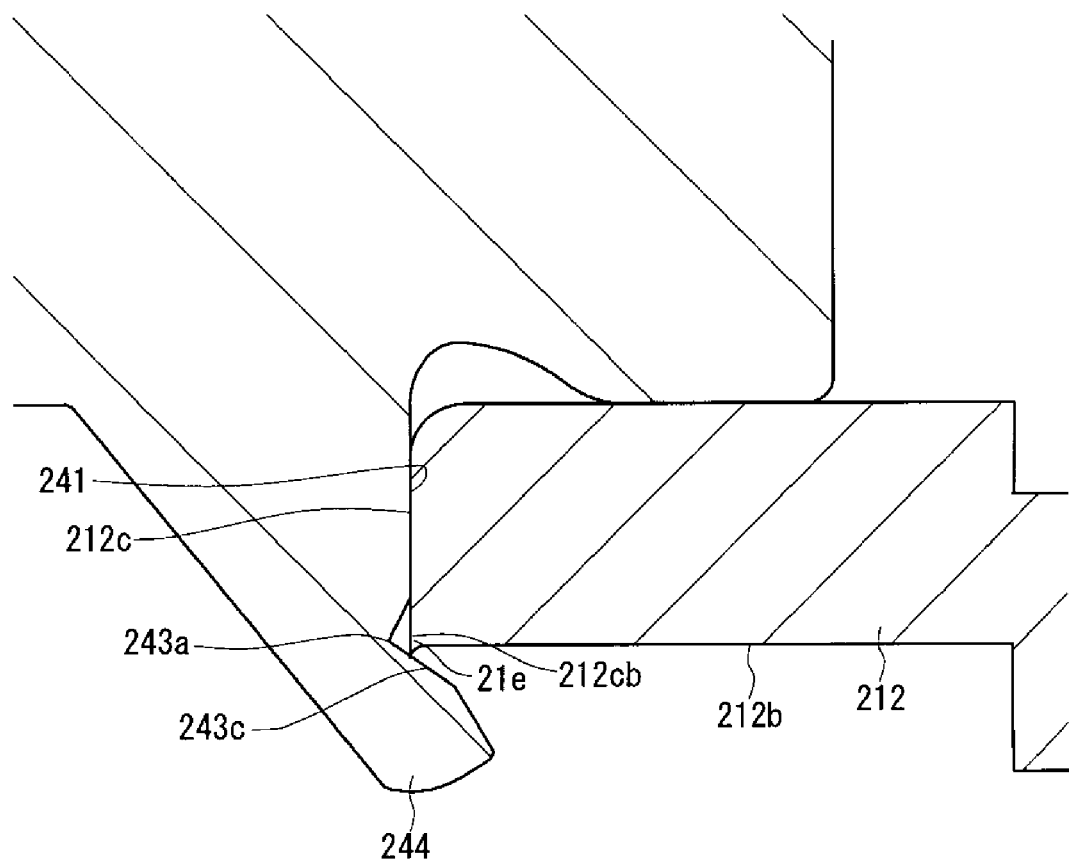
FIG. 7 is a partially enlarged section view showing the jut and its vicinities under the caulking process of the first embodiment.
Figure 8:
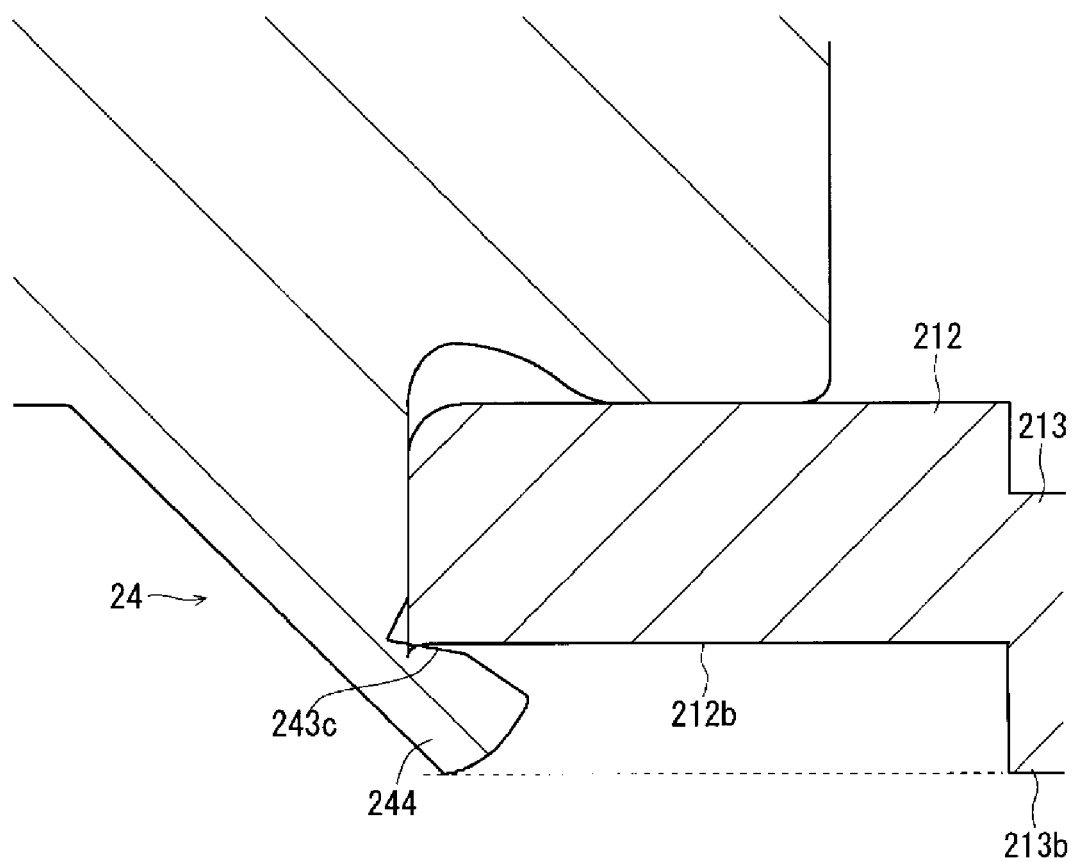
FIG. 8 is a partially enlarged section view showing the jut and its vicinities after the caulking process has been completed in the first embodiment.

Next, the caulking process of the motor of one embodiment is described in detail with reference to FIGS. 5, and 8. FIG. 7 is a partially enlarged section view showing the jut and its vicinities during the caulking process. FIG. 8 is a partially enlarged section view showing the jut and its vicinities after the caulking process has been completed.

First, the state prior to applying the caulking process is described. As shown in FIG. 5, the lower surface 223*b* of the flange portion 223 and the upper surface 212*a* of the first plate portion 212 can be brought into contact with each other. However, it is not always necessary that the outer circumferential surface 24*a* (especially, the first outer circumferential surface 241) of the jut 24 comes into contact with the inner circumferential surface 212*c* of the first plate portion 212. They can be opposed to each other with a minute gap left therebetween. The groove 243 of the embodiment has a cross-sectional shape similar to an isosceles triangle or V-like character. Therefore, the dimension of the first slanting surface 243*b* and the dimension of the second slanting surface 243*c* can be substantially equal to each other when seen in a section view, as illustrated in FIG. 5. The apex portion 243*a* of the groove 243 lies in the position corresponding to the apex angle of an isosceles triangle.

The apex portion 243*a* of the groove 243 can be positioned substantially at the same axial level as the lower surface 212*b* of the first plate portion 212 or slightly above the lower surface 212*b* of the first plate portion 212. The position of the groove 243 formed on the outer circumferential surface 24*a* (see FIG. 4) of the jut 24 depends on the position of the apex portion 243*a* of the groove 243, or the position of the pivot point for caulking.

As mentioned earlier, the end extension of the jut 24 can be positioned below the apex portion 243*a*, including the second slanting surface 243*c* and the second outer circumferential surface 242 that can be plastically deformed about a pivot point near the apex portion 243*a* by means of a caulking jig. The end extension is here called as a free end portion (or a caulking portion) 244.

Then, a caulking process can be started. The free end portion 244 of the jut 24 can be plastically deformed by bringing a caulking jig (not shown) into contact with the inner circumferential surface of the free end portion 244 and pressing the free end portion 244 radially outwards, at which time the apex portion 243*a* of the groove 243 can be used as a pivot point.

As the plastic deformation begins to occur, at least a portion of the first outer circumferential surface 241 of the jut 24 can make contact with the inner circumferential surface 212*c* of the first plate portion 212. During the caulking process, a portion of the first outer circumferential surface 241 of the jut 24 can be opposed to the inner circumferential surface 212*c* of the first plate portion 212 with a minute gap left therebetween.

Here, the caulking force can not be radially applied to the first plate portion 212, and therefore, deformation of the first plate portion 212 can be reduced.

When the free end portion 244 of the jut 24 is plastically deformed radially outwards about a pivot point near the apex portion 243*a* of the jut 24 as illustrated in FIG. 7, the second slanting surface 243*c* of the free end portion 244 can make contact with the lower surface 212*b* and/or the inner-circumferential lower end portion 212*cb* of the first plate portion 212. The caulking force can be transferred to the first plate portion 212 through the lower surface 212*b* and/or the inner-circumferential lower end portion (or circumferential lower corner) 212*cb* thereof and is axially upwardly applied to the first plate portion 212. The shape of the groove 243 can be changed as the caulking process proceeds.

The projecting portion 21*e* protrudes downwards from the inner-circumferential lower end portion 212*cb* of the first plate portion 212. In the embodiment, the jut 24 can be made of brass while the projecting portion 21*e* (or the attachment plate 21 having the first plate portion 212) is made of iron or the like. Therefore, the projecting portion 21*e* can be cut into or embedded into the second slanting surface 243*c* of the free end portion 244 and securely fixed thereto like a wedge.

When the free end portion 244 has been plastically deformed and completed the caulking process as illustrated in FIG. 8, the angle between the lower surface 212*b* of the first plate portion 212 and the second slanting surface 243*c* of the free end portion 244 can be about 10 degrees. This degree can be 5° to 30°, and in particular, can be 7° to 20°. At this time, the tip end of the free end portion 244 of the jut 24 can be positioned on or above the lower surface 213*b* of the second plate portion 213. In other words, the axial dimension of the jut 24 (or the free end portion 244) extending radially outwards at the end of the caulking process can be set substantially equal to or smaller than the axial dimension from the lower surface 212*b* of the first plate portion 212 to the lower surface 213*b* of the second plate portion 213. With this configuration, the jut 24 (or the free end portion 244) having completed the plastic deformation does not protrude downwards beyond the lower surface 213*b* of the second plate portion 213, thereby preventing the jut 24 from contacting other members.

Figure 9:
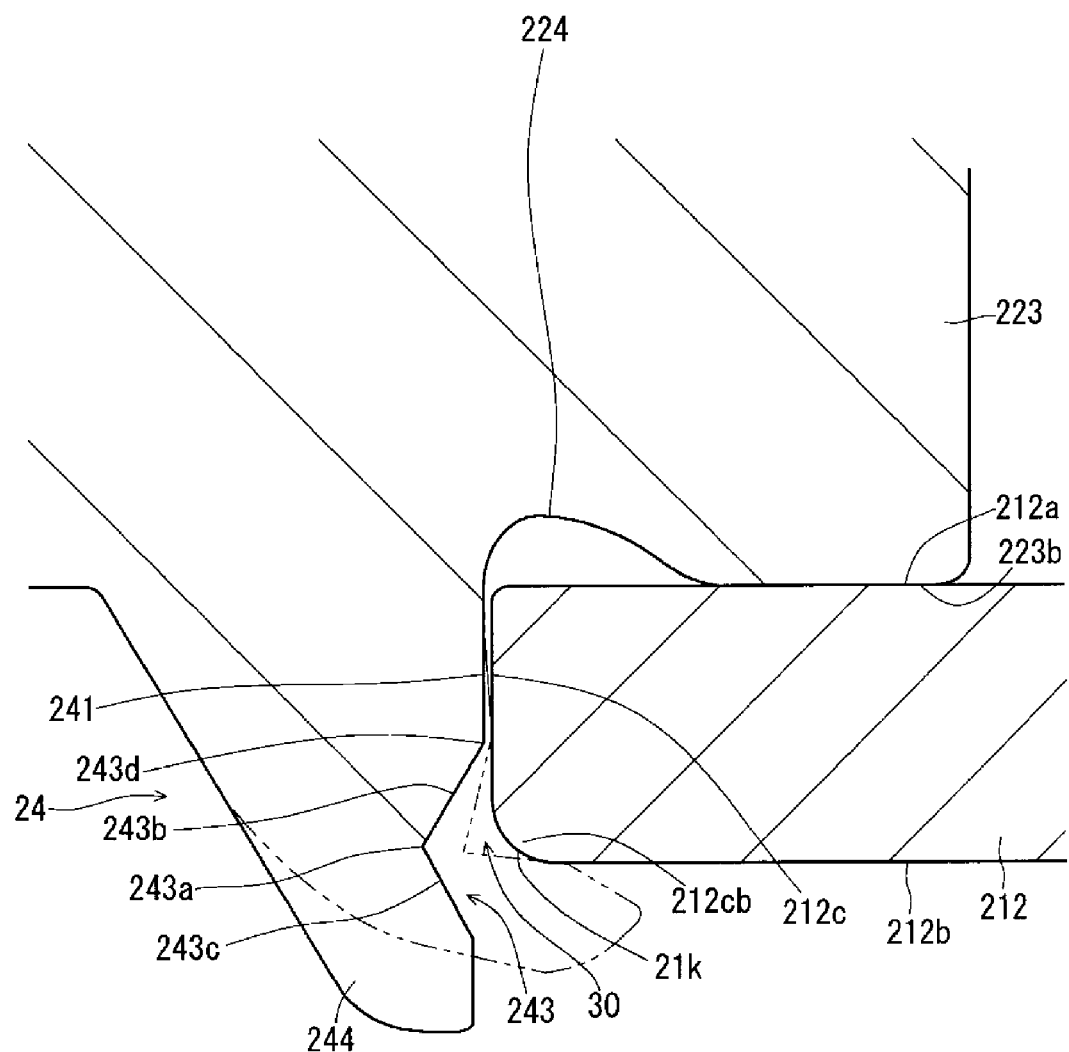
FIG. 9 illustrates another example of plastic deformation of the jut of the second embodiment.

It is not always necessary that the plastic deformation of the jut 24 occur about the pivot point near the apex portion 243*a*. FIG. 9 illustrates another embodiment of the plastic deformation of the jut 24. In FIG. 9, the jut 24 prior to the plastic deformation is indicated by a solid line while the jut 24 after the plastic deformation is indicated by a double-dotted chain line.

In the embodiment as illustrated in FIG. 9, when the caulking process is started, the upper end portion 243*d* of the groove 243 can make contact with the inner circumferential surface 212*c* of the first plate portion 212. Then, the portion of the jut 24 positioned below the upper end portion 243*d* of the groove 243 can be plastically deformed radially outwards using the upper end portion 243*d* of the groove 243 as a first pivot point. The portion of the jut 24 positioned below the apex portion 243*a* of the groove 243 can be plastically deformed radially outwards using the apex portion 243*a* as a second pivot point.

According to the embodiment illustrated in FIG. 9, the second slanting surface 243*c* can be brought into contact with the lower surface 212*b* and/or the inner-circumferential lower end portion 212*cb* of the first plate portion 212 more easily than when the plastic deformation is performed using only the apex portion 243*a* as a pivot point. In addition, the axial component of the caulking force acting between the jut 24 and the first plate portion 212 becomes greater. This makes it possible to further suppress deformation of the attachment plate 21 while securely fixing the sleeve housing 222 and the attachment plate 21 together.

By suppressing deformation of the attachment plate 21, the difference in the deformation amount of the attachment plate 21 generated in the positions of the attachment holes 21g, 21h and 21i can be reduced, thereby to prevent the brushless motor 12 from being tilted within the storage disk drive apparatus 1.

In case of the plastic deformation of the embodiment as illustrated in FIG. 9, the upper end portion 243d of the groove 243 can be arranged in such a position that it can make contact with the inner circumferential surface 212c of the first plate portion 212. In the embodiment as illustrated in FIG. 9, the upper end portion 243d of the groove 243 is positioned higher than the lower surface 212b of the first plate portion 212 but lower than the upper surface 212a of the first plate portion 212, when the lower surface 223b of flange portion 223 and the upper surface 212a of the first plate portion 212 are brought into contact with each other. Thus, the upper end portion 243d of the groove 243 comes into contact with the inner circumferential surface 212c of the first plate portion 212 and works well as the first pivot point.

In the embodiment as illustrated in FIG. 9, a curved surface portion (or circumferential lower corner) 21k is provided on the inner circumferential edge of the lower surface 212b of the first plate portion 212. The curved surface portion 21k has an inclination getting steeper and steeper from the lower surface 212b toward the inner circumferential surface 212c. In this embodiment, the upper end portion 243d of the groove 243 can be positioned higher than the upper end of the curved surface portion 21k, thereby to bring the upper end portion 243d of the groove 243 into strong contact with the inner circumferential surface 212c of the first plate portion 212.

In view of the fixing strength of the attachment plate 21 and the sleeve housing 222, the first outer circumferential surface 241 of the jut 24 and the inner circumferential surface 212c of the first plate portion 212 can make contact with each other over a broader area. To this end, the upper end portion 243d of the groove 243 can be positioned lower than the axial midpoint of the inner circumferential surface 212c of the first plate portion 212.

When the caulking process is completed, a gap such as an air gap 30 is left as a remnant of the groove 243 between the jut 24 of the sleeve housing 222 and the inner circumferential surface 212c of the first plate portion 212. Formation of the gap 30 can affirmatively confirm that the groove 243 has existed in the jut 24 prior to occurrence of the plastic deformation. However, the gap 30 can be removed by close contact of the first and second slanting surfaces 243b and 243c of the jut 24 with the first plate portion 212. The present invention does not exclude the case where the gap 30 is absent.

4. Other Embodiments

Other embodiments are described hereinafter.

Determination on which of the first slanting surface 243b and the second outer circumferential surface 242 of the free end portion 244 is brought into contact with the lower surface 212b and the inner-circumferential lower end portion 212cb, can be made by suitably setting the magnitude relationship between the cross-sectional dimensions of the first and second slanting surfaces 243b and 243c.

While the cross-sectional dimension of the first slanting surface 243b is substantially equal to the cross-sectional dimension of the second slanting surface 243c in the foregoing preferred embodiment, the present invention shall not be limited thereto. As an alternative embodiment, even if the cross-sectional dimension of the first slanting surface 243b is smaller than the cross-sectional dimension of the second slanting surface 243c, it is still possible to bring the second slanting surface 243c into contact with the lower surface 212b and/or the inner-circumferential lower end portion 212cb of the first plate portion 212.

Figure 10:
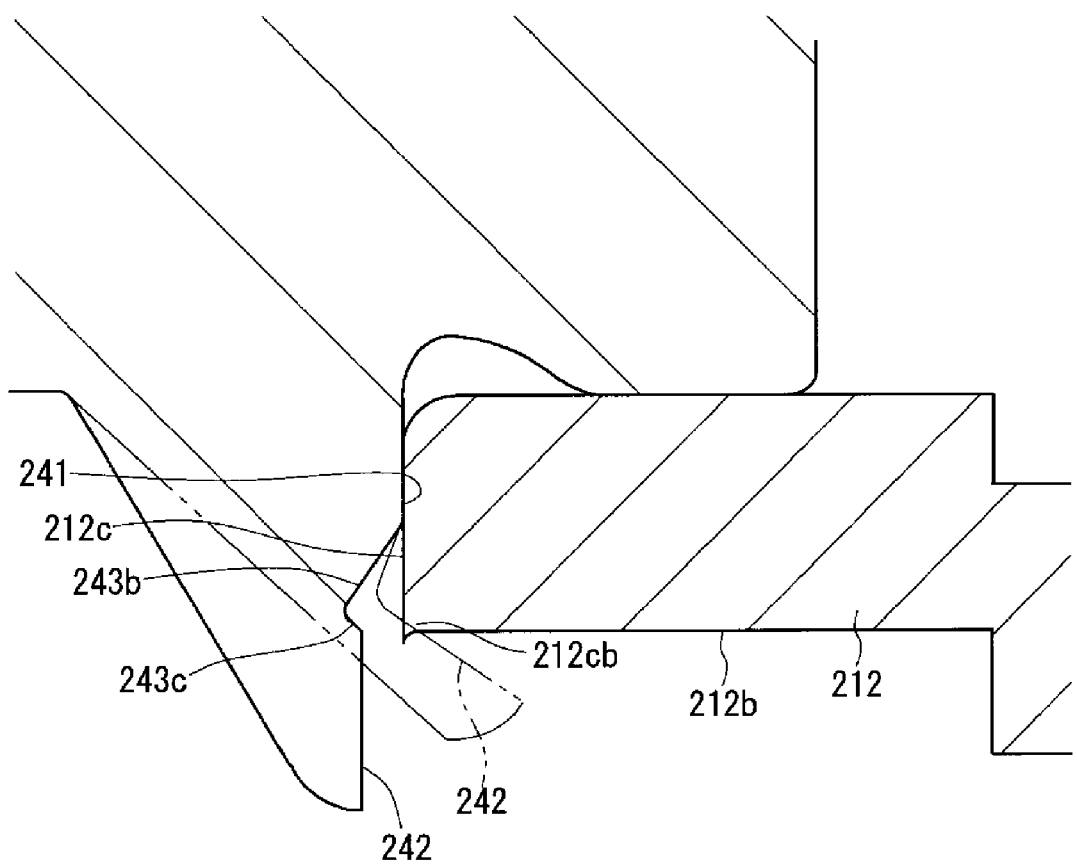
FIG. 10 illustrates a second circumferential surface coming into contact with a first plate portion in a storage disk drive motor according to the third embodiment of the present invention.

As illustrated in FIG. 10, the cross-sectional dimension of the first slanting surface 243b can be set greater than the cross-sectional dimension of the second slanting surface 243c. The second outer circumferential surface 242 can be positioned radially inwards of the first outer circumferential surface 241 but radially outwards of the apex portion 243a of the groove 243. With this configuration, it is possible to bring the second outer circumferential surface 242 of the free end portion 244 into contact with the lower surface 212b and/or the inner-circumferential lower end portion 212cb of the first plate portion 212. The double-dotted chain line in FIG. 10 indicates the free end portion 244 which has been subjected to the caulking process.

While the jut 24 protrudes cylindrically downwards from the lower surface 223b of the flange portion 223 in the forgoing embodiment, it can be changed as follow. For example, it can employ a plurality of circumferentially spaced-apart juts or a hollow polygonal jut.

While the groove 243 of the forgoing embodiments is shaped into a substantially "V"-like cross-sectional shape opened radially outwards in a pre-caulking state, it can be changed as follows. The groove 243 can be of many different shapes other than the substantially "V"-like cross-sectional shape, e.g., an arc-like cross-sectional shape, as long as it is opened radially outwards.

Figure 11:
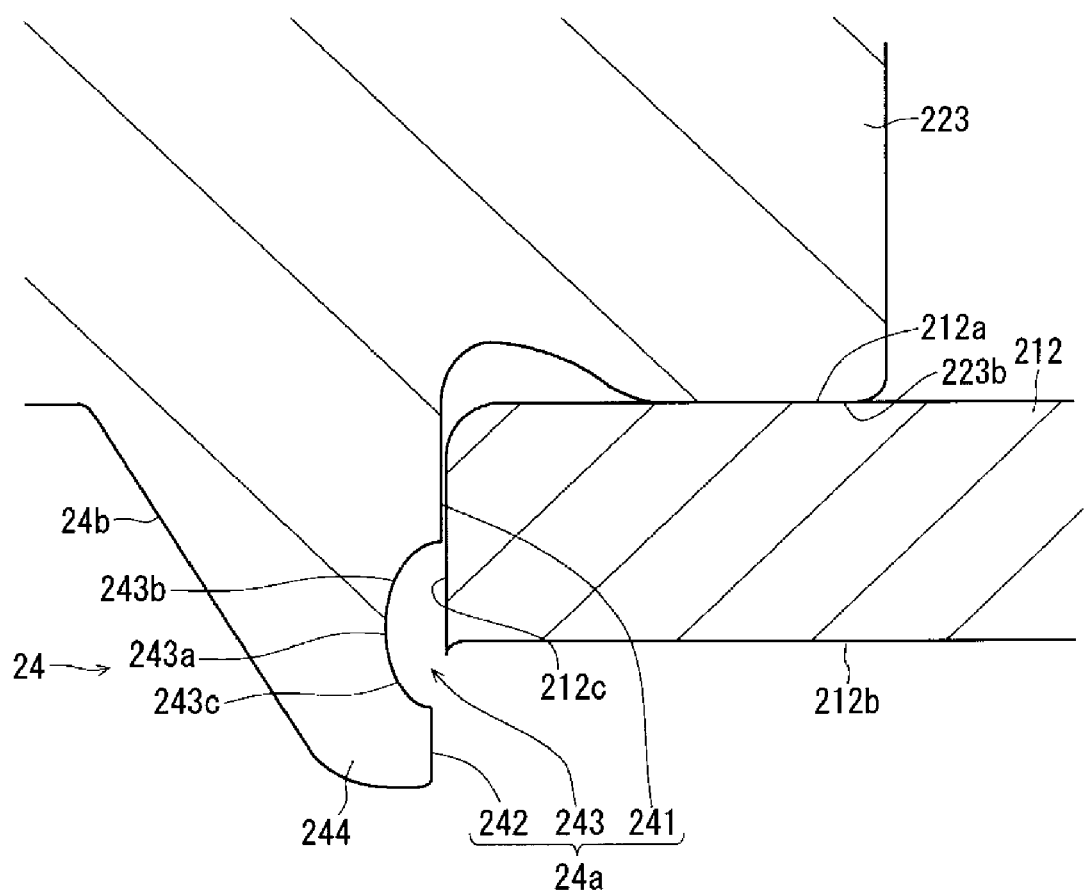
FIG. 11 is an enlarged vertical section view showing a jut and its vicinities in a storage disk drive motor according to the fourth embodiment of the present invention.

For example, as illustrated in FIG. 11, the groove 243 can be of a substantially arc-like cross-sectional shape. In the embodiment as shown in FIG. 11, the radially innermost portion of the groove 243 becomes the apex portion 243a. The surface portion of the groove 243 positioned above the apex portion 243a becomes the first slanting surface 243b, while the surface portion of the groove 243 positioned below the apex portion 243a becomes the second slanting surface 243c.

In the foregoing embodiment, the second slanting surface 243c of the free end portion 244 can make contact with the lower surface 212b and/or the inner-circumferential lower end portion 212cb of the first plate portion 212 after the first outer circumferential surface 241 of the jut 24 comes into contact with the inner circumferential surface 212c of the first plate portion 212. However, the present invention shall not be limited thereto. Depending on the shape of the groove 243, the second slanting surface 243c of the free end portion 244 can first make contact with the lower surface 212b and/or the inner-circumferential lower end portion 212cb of the first plate portion 212.

In the motor according to the foregoing embodiment, the sleeve unit 22 includes the sleeve 221 and the sleeve housing 222. However, the present invention shall not be limited thereto. For example, the sleeve 221 and the sleeve housing 222 can be provided as a single member. Likewise, the sleeve housing 222 and the seal cap 26 can be provided as a single member.

Figure 12:
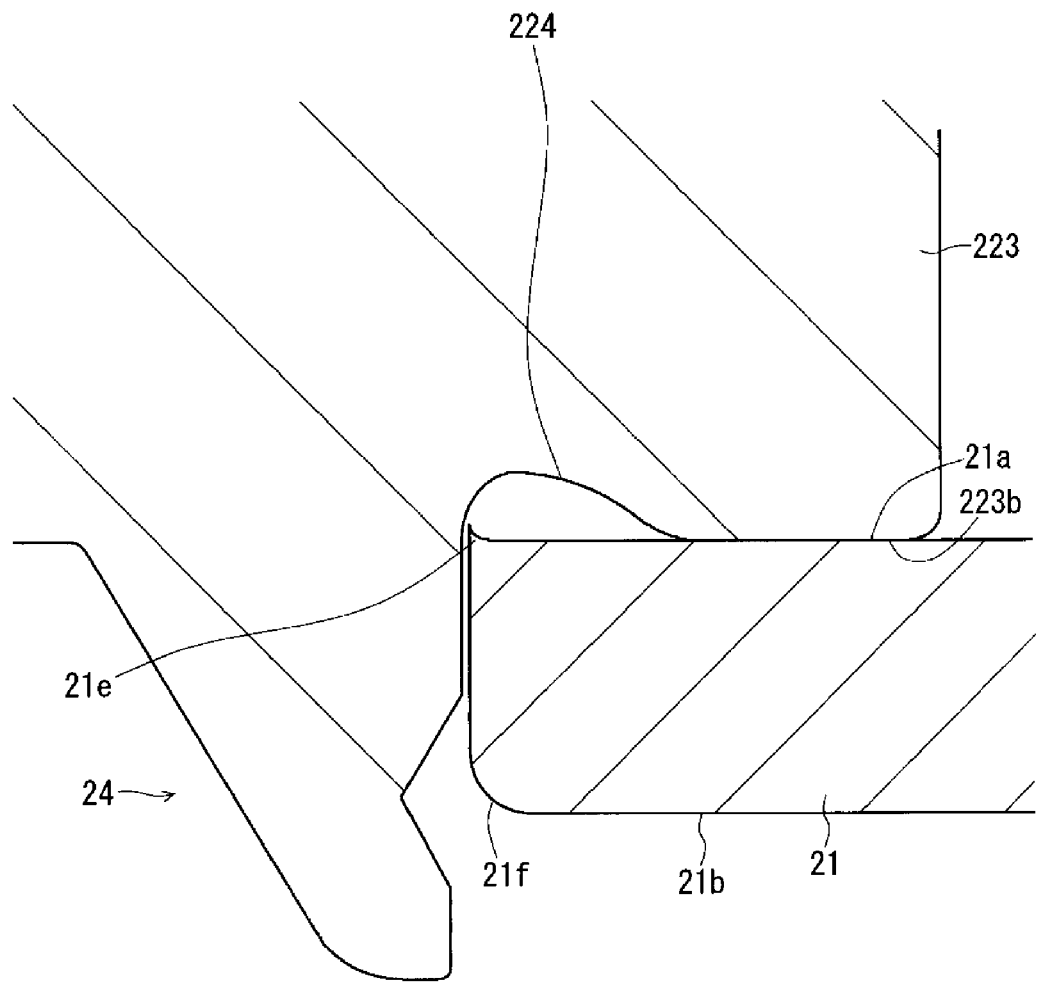
FIG. 12 illustrates a jut and its vicinities in a storage disk drive motor according to the fifth embodiment of the present invention.

As illustrated in FIG. 12, the attachment plate 21 can be arranged in such a way that the projecting portion 21e can be formed on the upper surface 21a, with the curved surface portion 21f formed on the lower surface 21b. In this case, the projecting portion 21e can be accommodated within the annular groove 224. This makes it possible to eliminate the likelihood that the projecting portion 21e comes into contact with the lower surface 223b of the flange portion 223, thus lifting the attachment plate 21 away from the lower surface 223b. It is also possible to prevent the attachment plate 21 from being fixed to the sleeve unit 22 in a tilted state, which would occur if the projecting portion 21e comes into contact with the lower surface 223b of the flange portion 223. Since the curved surface portion 21f can be positioned on the lower surface 21b of the attachment plate 21, the tip end of the jut 24 can be slid along the curved surface portion 21f when it is subjected to plastic deformation. This makes it easy to perform the caulking process. An adhesive agent can be applied on the annular groove 224. This makes it possible to fix the attachment plate 21 and the flange portion 223 together by the adhesive agent as well as the caulking. If an adhesive agent is applied within the annular groove 224, it can be held between the curved surface portion 21f of the attachment plate 21 and the first outer circumferential surface 241 of the jut 24 by a capillary force (or a surface tension). This can increase the bonding strength of the first outer circumferential surface 241 of the jut 24 and the attachment plate 21.

Figure 13:
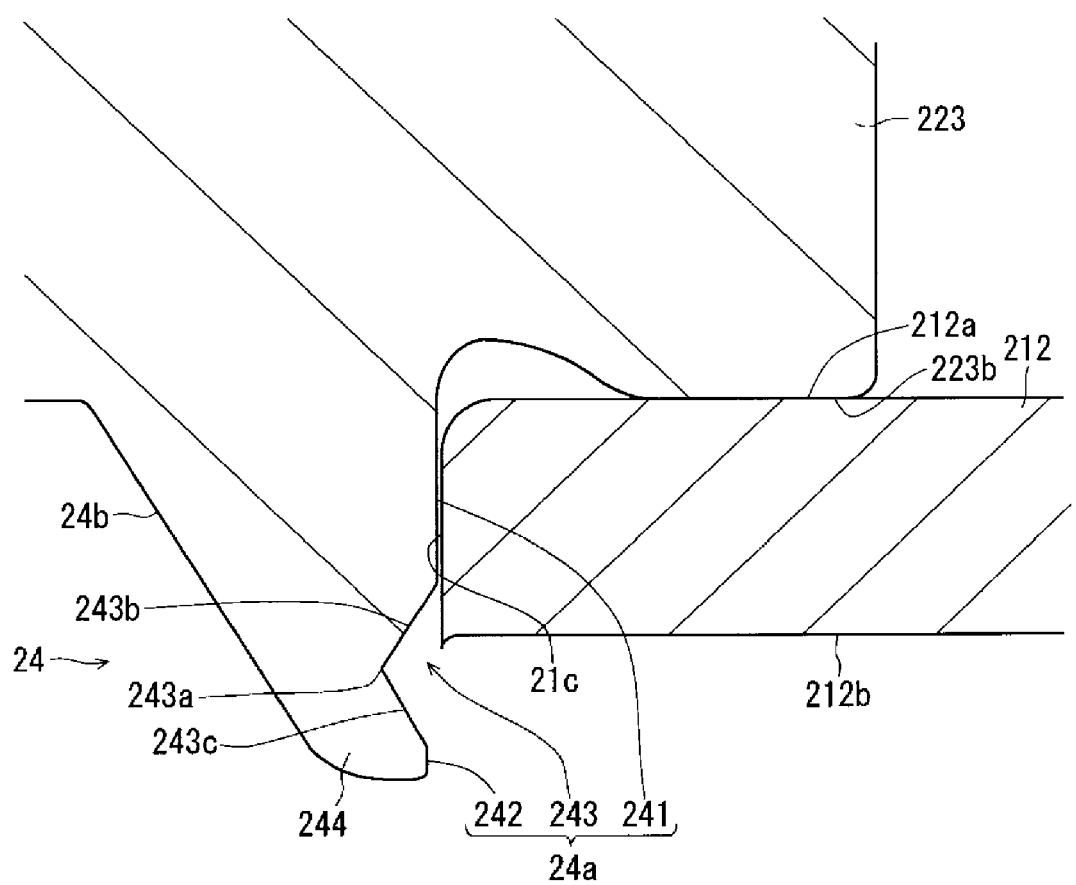
FIG. 13 is an enlarged vertical section view showing a jut and its vicinities in a storage disk drive motor according to the sixth embodiment of the present invention.

The apex portion 243a can be arranged in one of an axial position between the upper surface 21a and the lower surface 21b of the attachment plate 21 (or the first plate portion 212), an axial position corresponding to the inner-circumferential upper end portion (or the upper surface 21a) of the attachment plate 21 and an axial position corresponding to the inner-circumferential lower end portion (or the lower surface 21b) of the attachment plate 21. As illustrated in FIG. 13, the apex portion 243a of the groove 243 can be arranged lower than the lower surface 212b of the first plate portion 212.

The present invention can be applied as a motor for rotating various kinds of removable disks, optical disks, magneto-optical disks, flexible disks, hard disks, and so forth. The motor according to the foregoing embodiments can be used in the field of motors that requires high rotational accuracy.

While the foregoing embodiments are directed to a shaft-rotating motor, the present invention can be applied to a shaft-fixed motor.

INDUSTRIAL APPLICABILITY

The present invention can be applied to a method for manufacturing a storage disk drive motor. Furthermore, the present invention can be applied to a storage disk drive motor and a storage disk drive apparatus provided with the same.

What is claimed is:

1. A method for manufacturing a storage disk drive motor, comprising:
   providing a base member comprising:
      an upper surface;
      a lower surface; and
      a through-hole communicating with the upper surface and the lower surface, the through-hole having a circumferential lower corner at a lower end of the through hole;
   providing a sleeve unit comprising a flange lower surface and a jut locating at a radially inward side of the flange lower surface, the jut protruding downwards beyond the flange lower surface, wherein the jut has a radially outer circumferential surface comprising:
      a first outer circumferential surface;
      a second outer circumferential surface positioned below the first outer circumferential surface; and
      a groove positioned between the first outer circumferential surface and the second outer circumferential surface;
   inserting the sleeve unit into the through-hole;
   contacting the upper surface with the flange lower surface, the jut positioning lower than the circumferential lower corner, the first outer circumferential surface contacting the through hole; and
   plastically deforming the jut radially outwards to contact the lower surface and/or the circumferential lower corner, the second outer circumferential surface positioning radially outside the circumferential lower corner.

2. The method of claim 1, wherein the groove has an upper end portion positioned higher than the lower surface of the base member after the step of the plastic deformation is completed.

3. The method of claim 2, wherein the base member further comprises an inner circumferential surface of the through-hole, wherein the circumferential lower corner is made of a curved surface portion, the curved surface portion having an inclination getting steeper and steeper from the lower surface toward the inner circumferential surface, the upper end portion of the groove being positioned higher than an upper end of the curved surface portion after the step of the plastic deformation is completed.

4. The method of claim 2, wherein the upper end portion of the groove is positioned lower than a vertical midpoint of the inner circumferential surface of the base member after the step of the plastic deformation has been completed.

5. The method of claim 2, wherein the storage disk drive motor has a central axis,
   wherein the base member further comprises a first fastening portion and a second fastening portion, each of the first fastening portion and the second fastening portion fastens the base member to a member of a storage disk drive apparatus,
   wherein a first distance between the first fastening portion and the central axis differs from a second distance between the second fastening portion and the center axis.

6. The method of claim 2, wherein the base member has a shape which is not rotationally symmetrical with respect to the center axis of the storage disk drive motor.

7. A storage disk drive motor, which comprises:
   a stator unit;
   a rotor unit rotatable with respect to the stator unit, the rotor unit comprising a disk support portion arranged to support a storage disk thereon;
   a shaft having a central axis extending vertically;
   a sleeve unit comprising a flange lower surface and a jut locating at a radially inward of the flange lower surface, the jut protruding downwards beyond the flange lower surface, wherein the jut has a radially outer circumferential surface comprising:
      a first outer circumferential surface;
      a second outer circumferential surface positioned below the first outer circumferential surface; and
      a groove positioned between the first outer circumferential surface and the second outer circumferential surface;
   a base member comprising an upper surface, a lower surface, a through-hole communicating between the upper surface and the lower surface, and a circumferential lower corner at a lower end of the through-hole,
   wherein the jut is inserted into the through-hole,
   wherein the flange lower surface contacts the upper surface of the base member,
   wherein the jut plastically deformed radially outwards contacts the lower surface and/or the circumferential lower corner of the base member, wherein the first outer circumferential surface contacts the through hole, wherein the second outer circumferential surface positions radially outside the circumferential lower corner.

8. The motor of claim 7, wherein the base member further comprises: a first plate portion provided with the circumferential lower corner; and a second plate portion positioned radially outwards of the first plate portion at a level lower than the first plate portion, the first plate portion including the upper surface contacting the flange lower surface.

9. The motor of claim 7, wherein the groove comprises an apex portion provided in an innermost position thereof, wherein the apex portion is arranged in a manner selected from the group consisting of: the apex portion being located in an axial level between the upper surface and the lower surface; the apex portion being located at an axial level corresponding to a circumferential upper corner of the base member, and the apex portion being located at an axial level corresponding to the circumferential lower corner of the base member.

10. The motor of claim 7, wherein the groove comprises an apex portion provided in an innermost position thereof, the dimension in the radial direction from the apex portion to a radial inner portion of the jut being smaller than the dimension in the radial direction from the first outer circumferential surface to the radial inner portion of the jut when the jut is in a pre-caulking state.

11. The method of claim 1, wherein the groove has a substantially "V"-like cross-sectional shape opened radially outwards in a pre-caulking state.

12. The motor of claim 7, wherein the groove comprises:
an apex portion provided in an innermost position thereof;
a first slanting surface extending upwards from the apex portion; and
a second slanting surface extending downwards from the apex portion, the second slanting surface contacting the circumferential lower corner of the base member.

13. The method of claim 1, wherein the groove comprises:
an apex portion provided in an innermost position thereof;
a first slanting surface extending upwards from the apex portion; and
a second slanting surface extending downwards from the apex portion, the second slanting surface contacting the circumferential lower corner of the base member,
wherein the groove has a cross-sectional view running at the central axis, indicating that the first slanting surface a dimension substantially equal to that of the second slanting surface in a pre-caulking state.

14. The motor of claim 13, wherein the first slanting surface and the second slanting surface make an angle of about 15 degrees with respect to the center axis in a pre-caulking state.

15. The motor of claim 8, wherein the axial dimension of the jut extending axially outwards after the plastic deformation is substantially equal to or smaller than the axial dimension between the lower surface of the first plate portion and the lower surface of the second plate portion.

16. The motor of claim 7, further comprising a circuit board mounted on the second plate portion, the base member further comprising a step portion arranged to join the first plate portion and the second plate portion together, the step portion being positioned between an inner circumferential portion of the circuit board and an outer circumferential portion of the flange portion.

17. The motor of claim 7, wherein the base member further comprising a projecting portion formed at the circumferential lower corner and a curved surface portion formed at a circumferential upper corner.

18. The motor of claim 7, wherein the sleeve unit further comprises a substantially cylindrical sleeve into which the shaft is inserted and a sleeve housing into which the sleeve is inserted, the flange portion being formed radially outwards of the sleeve housing.

19. The motor of claim 7, wherein a gap is defined between the inner circumferential surface of the base member and the jut.

20. A storage disk drive apparatus, which comprises:
an apparatus housing;
the storage disk drive motor of claim 7 fixed within the apparatus housing to rotate the storage disk; and
a recording/reproducing unit arranged to perform a task of reading out information from the storage disk and/or a task of writing information on the storage disk.

* * * * *